US012382234B2

(12) United States Patent
Master et al.

(10) Patent No.: US 12,382,234 B2
(45) Date of Patent: Aug. 5, 2025

(54) PERCEPTUAL OPTIMIZATION OF MAGNITUDE AND PHASE FOR TIME-FREQUENCY AND SOFTMASK SOURCE SEPARATION SYSTEMS

(71) Applicants: Dolby Laboratories Licensing Corporation, San Francisco, CA (US); DOLBY INTERNATIONAL AB, Dublin (IE)

(72) Inventors: Aaron Steven Master, San Francisco, CA (US); Lie Lu, San Francisco, CA (US); Heiko Purnhagen, San Francisco, CA (US)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 296 days.

(21) Appl. No.: 18/008,431

(22) PCT Filed: Jun. 10, 2021

(86) PCT No.: PCT/US2021/036866
§ 371 (c)(1),
(2) Date: Dec. 5, 2022

(87) PCT Pub. No.: WO2021/252795
PCT Pub. Date: Dec. 16, 2021

(65) Prior Publication Data
US 2023/0232176 A1 Jul. 20, 2023

Related U.S. Application Data

(60) Provisional application No. 63/038,052, filed on Jun. 11, 2020.

(30) Foreign Application Priority Data
Jun. 11, 2020 (EP) .................................... 20179450

(51) Int. Cl.
*H04S 7/00* (2006.01)
*G10L 21/0272* (2013.01)
(Continued)

(52) U.S. Cl.
CPC ............ *H04S 7/30* (2013.01); *G10L 21/0308* (2013.01); *G10L 25/18* (2013.01); *H04S 1/007* (2013.01); *H04S 2400/11* (2013.01)

(58) Field of Classification Search
None
See application file for complete search history.

(56) References Cited

U.S. PATENT DOCUMENTS 8,180,062 B2 5/2012 Turku
8,238,569 B2 8/2012 Jeong
(Continued)

FOREIGN PATENT DOCUMENTS

AU 2004286507 B2 10/2010
AU 2012241166 B2 12/2016
(Continued)

OTHER PUBLICATIONS

Aaron Master et al., Stereo Speech Enhancement Using Custom Mid-Side Signals and Monaural Processing ARIXIV.Org, Cornell University Library, 201 Olin Library Cornell university Ithaca, NY 14853. XP091379367.
(Continued)

*Primary Examiner* — Qin Zhu

(57) ABSTRACT

A method comprises: obtaining softmask values for frequency bins of time-frequency tiles representing an audio signal; reducing, or expanding and limiting, the softmask
(Continued)

values; and applying the reduced, or expanded and limited, softmask values to the frequency bins to create a time-frequency representation of an estimated target source. An alternative method comprises, for each time-frequency tile: obtaining softmask values; applying the softmask values to the frequency bins to create a time-frequency domain representation of an estimated target source; obtaining a panning parameter and a source concentration estimates for the target source; determining, using the panning parameter estimate and the softmask values, a magnitude for the time-frequency representation of the estimated target source; determining, using the panning parameter estimate and the source phase concentration estimate, a phase for the time-frequency representation of the estimated target source; and combining the magnitude and the phase.

15 Claims, 3 Drawing Sheets

(51) Int. Cl.

| | |
|---|---|
| ***G10L 21/0308*** | (2013.01) |
| ***G10L 25/18*** | (2013.01) |
| ***H04S 1/00*** | (2006.01) |

(56) References Cited

U.S. PATENT DOCUMENTS

| | | | | |
|---|---|---|---|---|
| 8,321,214 | B2 | 11/2012 | Chan et al. | |
| 8,379,868 | B2 | 2/2013 | Goodwin et al. | |
| 8,472,631 | B2 | 6/2013 | Klayman | |
| 8,509,464 | B1 | 8/2013 | Kato | |
| 8,600,533 | B2 | 12/2013 | Berchin | |
| 9,008,329 | B1 | 4/2015 | Mandel | |
| 9,053,697 | B2 | 6/2015 | Park | |
| 9,111,526 | B2 | 8/2015 | Visser | |
| 9,324,337 | B2 | 4/2016 | Brown | |
| 9,438,992 | B2 | 9/2016 | Every | |
| 9,699,554 | B1 | 7/2017 | Choi | |
| 9,881,631 | B2 | 1/2018 | Erdogan | |
| 10,043,527 | B1 | 8/2018 | Gurijala | |
| 10,075,797 | B2 | 9/2018 | Thompson | |
| 10,123,134 | B2 | 11/2018 | Jensen | |
| 10,192,568 | B2 | 1/2019 | Wang | |
| 10,321,241 | B2 | 6/2019 | Lunner | |
| 10,347,271 | B2 | 7/2019 | Nesta | |
| 10,373,623 | B2 | 8/2019 | Dittmar | |
| 10,430,154 | B2 | 10/2019 | Gillespie | |
| 11,115,774 | B2 | 9/2021 | Zhang | |
| 11,184,709 | B2 | 11/2021 | Purnhagen | |
| 11,190,900 | B2 | 11/2021 | McElveen | |
| 2004/0062401 | A1 | 4/2004 | Davis | |
| 2007/0076902 | A1 | 4/2007 | Master | |
| 2009/0097670 | A1* | 4/2009 | Jeong | H04R 3/005 381/73.1 |
| 2009/0279715 | A1* | 11/2009 | Jeong | H04R 3/005 381/92 |
| 2010/0183158 | A1 | 7/2010 | Haykin | |
| 2015/0271620 | A1 | 9/2015 | Lando et al. | |
| 2015/0312663 | A1 | 10/2015 | Traa | |
| 2016/0071526 | A1 | 3/2016 | Wingate | |
| 2016/0203829 | A1* | 7/2016 | Vishnubhotla | G10L 19/09 704/207 |
| 2017/0061978 | A1 | 3/2017 | Wang | |
| 2017/0178664 | A1 | 6/2017 | Wingate | |
| 2017/0345433 | A1* | 11/2017 | Dittmar | G10L 13/04 |
| 2018/0088899 | A1 | 3/2018 | Gillespie | |
| 2018/0122689 | A1 | 5/2018 | Adkisson | |
| 2018/0299527 | A1 | 10/2018 | Helwani | |
| 2018/0308502 | A1 | 10/2018 | Parekh | |
| 2019/0043491 | A1 | 2/2019 | Kupryjanow | |
| 2019/0066713 | A1 | 2/2019 | Mesgarani | |
| 2019/0122689 | A1 | 4/2019 | Jain | |
| 2019/0132687 | A1 | 5/2019 | Santos | |
| 2019/0139562 | A1 | 5/2019 | Fueg | |
| 2019/0139563 | A1 | 5/2019 | Chen | |
| 2019/0164052 | A1 | 5/2019 | Sung | |
| 2019/0172476 | A1 | 6/2019 | Wung | |
| 2019/0180142 | A1 | 6/2019 | Lim | |
| 2019/0246203 | A1 | 8/2019 | Elko | |
| 2019/0251985 | A1 | 8/2019 | Yu | |
| 2022/0223144 | A1* | 7/2022 | Sun | G10L 15/16 |
| 2023/0215423 | A1 | 7/2023 | Master | |
| 2023/0232176 | A1 | 7/2023 | Master | |
| 2023/0245664 | A1 | 8/2023 | Master | |
| 2023/0245671 | A1 | 8/2023 | Master | |

FOREIGN PATENT DOCUMENTS

| | | | |
|---|---|---|---|
| CA | 2649911 | C | 12/2013 |
| CA | 2794946 | C | 2/2017 |
| CA | 2983359 | C | 11/2019 |
| WO | 2015024940 | A1 | 2/2015 |
| WO | 2019106221 | A1 | 6/2019 |
| WO | 2020232180 | A1 | 11/2020 |
| WO | 2021252823 | A1 | 12/2021 |
| WO | 2023172852 | A1 | 9/2023 |
| WO | 2023192036 | A1 | 10/2023 |
| WO | 2024167785 | A1 | 8/2024 |

OTHER PUBLICATIONS

Aaron Master et al., DeepSpace: Dynamic Spatial and Source Cue Based Source Separation for Dialog Enhancement, arxiv.org, Cornell University Library, 201 Olin Library Cornell University Ithaca, NY, 14853 Feb. 16, 2003. XP091439550.

Davila-Chacon, J., et al., Neural and Statistical Processing of Spatial Cues for Sound Source Localisation, The 2013 International Joint Conference on Neural Networks (IJCNN), 2013, pp. 1-8, doi: 10.1109/IJCNN.2013.6706886.

Tan Ke et al., Deep Learning Based Real-Time Speech Enhancement for Dual-Microphone Mobile Phones vol. 29, May 21, 2021, pp. 1853-1863. IEEE/ACM Transactions on Audio, Speech, and Language Processing, IEEEE, USA. XP011858848.

Master, S., et al., Dialog Enhancement via Spatio-Level Filtering and Classification, Audio Engineering Society, Convention Paper 10427, Oct. 2020.

Gu, R., et al., Enhancing End-to-End Multi-Channel Speech Separation Via Spatial Feature Learning, IEEE International Conference on Acoustics, Speech and Signal Processing (ICASSP), IEEE, May 4, 2020, pp. 7319-7323, XP033792752.

Fabian-Robert Stöter, et al., The 2018 Signal Separation Evaluation Campaign. arXiv:1804.06267v3 [eess.AS]. https://arxiv.org/abs/1804.0626.

Han, C., et al., Real-Time Binaural Speech Separation With Preserved Spatial Cues, Dept. of Electrical Engineering, Columbia University, New York, NY, Feb. 16, 2020, https://arxiv.org/abs/2002.06637.

Le Roux, J., et al., The Phasebook: Building Complex Masks Via Discrete Representations for Source Separation, ICASSP 2019. https://ieeexplore.ieee.org/document/8682587.

Master, Steven A., Stereo Music Source Separation via Bayesian Modeling, Doctoral thesis, Stanford University, http://citeseerx.ist.psu.edu/viewdoc/download?doi=I0.1.1.81.7477&rep=repl&type=pdf.

Reddy, A. M., et al., Soft Mask Methods for Single-Channel Speaker Separation, IEEE Transactions on Audio, Speech, and Language Processing, vol. 15, No. 6, pp. 1766-1776, Aug. 2007.

Kim Biho et al., Speech enhancement based on soft-masking exploiting both output SNR and selectivity of spatial filtering Electronics Letters, The Institution of Engineering and Technology, GB vol. 50, No. 12, Jun. 5, 2014; pp. 889-891.

Toroghi, R.M., Blind Speech Separation in Distant Speech Recognition Front-end Processing, Doctoral dissertation, Saarland University, Saarbrücken, Germany, Nov. 16, 2016.

(56) References Cited

OTHER PUBLICATIONS

Wang, De Liang, Time-Frequency Masking for Speech Separation and its Potential for Hearing Aid Design, Trends Amplif. 2008 Fall; 12(4): pp. 332-353.
Xia, S., et al., Using Optimal Ratio Mask as Training Target for Supervised Speech Separation, 2017 Asia-Pacific Signal and Information Processing Association Annual Summit and Conference (APSIPA ASC) (pp. 163-166). IEEE, Dec. 12, 2017.

* cited by examiner

PERCEPTUAL OPTIMIZATION OF MAGNITUDE AND PHASE FOR TIME-FREQUENCY AND SOFTMASK SOURCE SEPARATION SYSTEMS

CROSS-REFERENCE TO RELATED APPLICATION(S)

This application is a U.S. National Stage application under U.S.C. 371 of International Application No. PCT/US2021/036866, filed on 10 Jun. 2021 (reference: D19118WO01), which claims the priority of U.S. Provisional Patent Application No. 63/038,052, filed Jun. 11, 2020, and European Patent Application No. 20179450.0, filed Jun. 11, 2020, each of which are incorporated herein by reference in their entirety.

TECHNICAL FIELD

This disclosure relates generally to audio signal processing, and in particular to audio source separation techniques.

BACKGROUND

Audio mixes (e.g., stereo mixes) are created by mixing multiple audio sources together. There are several applications where it is desirable to detect and extract the individual audio sources from mixes, including but not limited to: remixing applications, where the audio sources are relocated in an existing two-or-more channel mix, upmixing applications, where the audio sources are located or relocated in a mix with a greater number of channels than the original mix, and audio source enhancement applications, where certain audio sources (e.g., speech/dialog) are boosted and added back to the original mix.

SUMMARY

The details of the disclosed implementations are set forth in the accompanying drawings and the description below. Other features, objects and advantages are apparent from the description, drawings and claims.

In an embodiment, a method comprises: obtaining softmask values for frequency bins of time-frequency tiles representing an audio signal, the audio signal including a target source and one or more backgrounds; reducing, or expanding and limiting, the softmask values; and applying the reduced, or expanded and limited, softmask values to the frequency bins to create a time-frequency representation of an estimated target source.

In an embodiment, the method further comprises setting to zero or near-zero the softmask values in the frequency bins that are outside a specified frequency range.

In an embodiment, the method further comprises smoothing the softmask values over time and frequency.

In an embodiment, the time-frequency tiles represent a two-channel audio signal, the frequency bins of the time-frequency tile are organized into subbands, and the method further comprises: obtaining a panning parameter estimate for the target source; obtaining a source phase concentration estimate for the target source, wherein the source phase concentration estimate is obtained by estimating a statistical distribution of phase differences between the multiple channels in the time-frequency tiles for capturing a predetermined audio energy of the target source; determining, using the panning parameter estimate, a magnitude for the time-frequency domain representation of the estimated target source; determining, using the panning parameter estimate and the source phase concentration estimate, a phase for the time-frequency representation of the estimated target source based; and combining the magnitude and the phase to create a modified time-frequency representation of the estimated target source.

In an embodiment, the method further comprises smoothing the estimated time-frequency tile.

In an embodiment, reducing the softmask values further comprises: estimating a bulk reduction threshold, wherein the bulk reduction threshold represents a balance point between softmask values that correlate with target dominant time-frequency tiles and softmask values that correlate with background dominant time-frequency tiles; and multiplying each softmask value that falls below the bulk reduction threshold by a fractional value.

In an embodiment, expanding and limiting the softmask values further comprises adding a fixed expansion addition value to the softmask values, and multiplying the softmask values by an expansion multiplier constant; and limiting any softmask values that are above 1.0 to 1.0.

In an embodiment, determining a phase for the time-frequency domain representation of the estimated target source further comprises: computing, using the panning parameter estimate, a first weight for a left channel phase and a second weight for a right channel phase; computing a weighted average of the left and right channel phases using the first weight and the second weight, respectively; and adjusting the phase parameter of the time-frequency tile for the time-frequency representation of the estimated target source to be the weighted average of the left and right channel phases.

In an embodiment, determining, using the panning parameter estimate, a magnitude for the time-frequency domain representation of the estimated target source further comprises: computing a left channel ratio as a function of the panning parameter estimate; computing a right channel ratio as a function the panning parameter estimate; computing a left channel magnitude for the left channel based on the product of the left channel ratio, a softmask value and a level of the frequency bin; and computing a right channel magnitude based on the product of the right channel ratio, the softmask value for the frequency bin and the level of the frequency bin.

In an embodiment, any of the methods herein described may comprise prior to obtaining the softmask values: transforming, using one or more processors, one or more frames of a time domain audio signal into a time-frequency domain representation including a plurality of time-frequency tiles, wherein the time domain audio signal includes a target source and one or more background, and wherein the frequency domain of the time-frequency domain representation includes a plurality of frequency bins grouped into a plurality of subbands. In an embodiment, any of the methods herein described may comprise, for each time-frequency tile: calculating, using the one or more processors, spatial parameters and a level for the time-frequency tile; obtaining, using the one or more processors, a softmask value for each frequency bin using the spatial parameters, the level and subband information; and reducing, or expanding and limiting, the softmask values; and applying, using the one or more processors, the softmask values to the time-frequency tile to generate a time-frequency tile of an estimated audio source.

In an embodiment, the method further comprises setting to zero or near-zero the softmask values in the frequency bins that are outside a specified frequency range.

In an embodiment, the method further comprises smoothing the softmask values over time and frequency.

In an embodiment, the time-domain audio signal is a multi-channel, e.g., two-channel, audio signal, the frequency bins of the time-frequency tile are organized into subbands, and the method further comprises: obtaining a panning parameter estimate for the target source; obtaining a source phase concentration estimate for the target source, wherein the source phase concentration estimate is obtained by estimating a statistical distribution of phase differences between the multiple channels in the time-frequency tiles for capturing a predetermined amount of audio energy of the target source; determining, using the panning parameter estimate, a magnitude for the time-frequency representation of the estimated target source; determining, using the panning parameter estimate and the source phase concentration estimate, a phase for the time-frequency representation of the estimated target source based; and combining the magnitude and the phase to create a modified time-frequency representation of the estimated target source.

In an embodiment, the method further comprises smoothing the estimated time-frequency tile.

In an embodiment, reducing the softmask values further comprises estimating a bulk reduction threshold representing a balance point between softmask values that correlate with target dominant time-frequency tiles and softmask values that correlate with background dominant time-frequency tiles, and multiplying each softmask value that falls below the bulk reduction threshold by a fractional value.

In an embodiment, expanding and limiting the softmask values further comprises adding a fixed expansion addition value to the softmask values; multiplying the softmask values by an expansion multiplier constant; and limiting any softmask values that are above 1.0 to 1.0.

In an embodiment, determining a phase for the time-frequency representation of the estimated target source based further comprises: computing, using the panning parameter estimate, a first weight for a left channel phase and a second weight for a right channel phase; computing a weighted average of the left and right channel phases using the first weight and the second weight, respectively; and adjusting the phase parameter of the time-frequency tile for the time-frequency representation of the estimated target source to be the weighted average of the left and right channel phases.

In an embodiment, determining a magnitude for the time-frequency representation of the estimated target source further comprises: computing a left channel ratio as a function of the panning parameter estimate; computing a right channel ratio as a function of the panning parameter estimate; computing a left channel magnitude for the left channel based on the product of the left channel ratio, a softmask value and a level of the frequency bin, and computing a right channel magnitude based on the product of the right channel ratio, the softmask value for the frequency bin and the level of the frequency bin.

In an embodiment, estimating the statistical distribution of the phase differences between the multiple channels in the time-frequency tiles further comprises: determining a peak value of the statistical distribution, determining a phase difference corresponding to the peak value, and determining a width of the statistical distribution around the peak value for capturing the amount of audio energy.

In an embodiment, the predetermined amount of audio energy is at least eighty percent of the total energy in the statistical distribution of the phase differences. However, the predetermined amount of audio energy may be any other percentages of the total energy suitable for the specific implementation.

Particular embodiments disclosed herein provide one or more of the following advantages. The disclosed embodiments allow for the improved extraction (source separatioπ) of a target source from a recording of a mix that consists of the source plus some backgrounds. More specifically, some of the disclosed embodiments improve the extraction of a source that is mixed (purely or mostly) using amplitude panning, which is the most common way that dialog is mixed in TV and movies. Being able to extract such sources enables dialog enhancement (which extracts and then boosts dialog in a mix) or upmixing.

The disclosed embodiments describe how to improve the perceptual performance of source separation systems that use softmasks, operate in the time-frequency domain, or both. The most common weaknesses of softmasks and the Short-Time-Fourier-Transform (STFT) representation are addressed using several perceptual improvements to the sound quality of the estimated target audio source. In particular, the perceptual improvements exploit psychoacoustics to reduce the perceived level of interference and thus improve the perceived quality of the source separation. The perceptual improvements include parameters that are easy for a system operator to manipulate, and thus provide the system operator with more flexibility to influence the quality of the source separation for particular applications.

DESCRIPTION OF DRAWINGS

In the accompanying drawings referenced below, various embodiments are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated software-based or hardware-based system for performing specified functions/operations or by a combination of dedicated hardware and computer instructions.

The same reference symbol used in various drawings indicates like elements.

DETAILED DESCRIPTION

Signal Model and Assumptions

Figure 1:
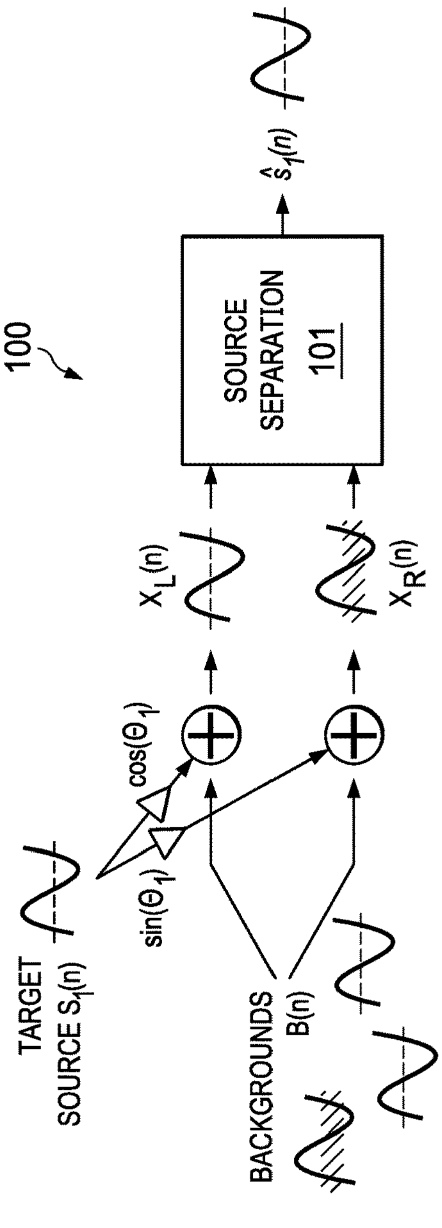
FIG. 1 illustrates a signal model for source separation depicting time domain mixing, in accordance with an embodiment.

FIG. 1 illustrates signal model 100 for source separation depicting time domain mixing, in accordance with an embodiment. This model is relevant to the phase optimization and panning optimization embodiments described below. Signal model 100 assumes basic time domain mixing of a target source, $s_1$, and backgrounds, b, into two channels, hereinafter referred to as "left channel" ($x_1$ or $X_L$) and "right channel" ($x_2$ or $X_R$) depending on the context. The two-channels are input in source separation system 101 which estimates $S_1$.

The target source, $s_1$, is assumed to be amplitude panned using a constant power law. Since other panning laws can be converted to the constant power law, the use of a constant power law in signal model 100 is not limiting. Under constant power law panning, the source, $s_1$, mixing to left/right (L/R) channels is described as follows:

$$x_1=\cos(\Theta_1)s_1, \quad [1]$$

$$x_2=\sin(\Theta_1)s_1, \quad [2]$$

where $\Theta_1$ ranges from 0 (source panned far left) to $\pi/2$ (source panned far right). This may be expressed in the Short Time Fourier Transform (STFT) domain as $$X_L=\cos(\Theta_1)S_1, \quad [3]$$

$$X_R=\sin(\Theta_1)S_1. \quad [4]$$

Continuing in the STFT domain, the addition of backgrounds, B, to each channel is expressed as:

$$X_L=\cos(\Theta_1)S_1+\cos(\Theta_B)|B|e^{j\angle B}, \quad [5]$$

$$X_R=\sin(\Theta_1)S_1+\sin(\Theta_B)|B|e^{j\angle B+\varphi B} \quad [6]$$

The backgrounds, B, have included additional parameters $\angle B$ and $\varphi_B$. These parameters respectively describe the phase difference between $S_1$ and the left channel phase of B, and the interchannel phase difference between the phase of B in the left and right channels in STFT space. Note that there is no need to include a psi parameter in Equations [5] and [6] because the interchannel phase difference for a panned source is by definition zero. The target $S_1$ and backgrounds B are assumed to share no particular phase relationship in STFT space, so the distribution on $\angle B$ may be modeled as uniform.

There are key spatial differences between the target source and backgrounds. Spatially, $\Theta_1$ is treated as a specific single value (the "panning parameter" for the target source $S_1$), but $\Theta_B$ and $\Phi_B$ each have a statistical distribution.

To review then, the "target source" is assumed to be panned meaning it can be characterized by $\Theta_1$. The interchannel phase difference for the target source is assumed to be zero. Below, the assumption of panned sources may be relaxed while still allowing for perceptual optimizations based on a panned source model.

In some embodiments, additional parameters are relevant when describing the time-frequency data. A parameter is the detected "panning" for each (ω,t) tile, which is defined as:

$$\Theta(\omega,t)=\arctan(|X_R(\omega,t)|/|X_L(\omega,t)|), \quad [7]$$

where "full left" is 0 and "full right" is $\pi/2$. It may be shown that, if the target source is dominant in a given time-frequency tile, Θ (ω,t) will approximately equal $\Theta_1$.

A parameter is the detected "phase difference" for each tile. This is defined as:

$$\varphi(\omega,t)=\text{angle}(X_L(\omega,t)/X_R(\omega,t)), \quad [8]$$

which ranges from −π to π, with 0 meaning the detected phase is the same in both channels. It can be shown that, if a given target source is dominant in a time-frequency tile, then φ (ω,t) will approximately equal zero.

A parameter is the detected "level" for each tile, defined as:

$$\varphi(\omega,t)=10*\log_{10}(|X_R(\omega,t)^2+|X_L(\omega,t)|^2), \quad [9]$$

which is just the "Pythagorean" magnitude of the two channels. It may be thought of as a sort of mono magnitude spectrogram.

Example Applications

Figure 2:
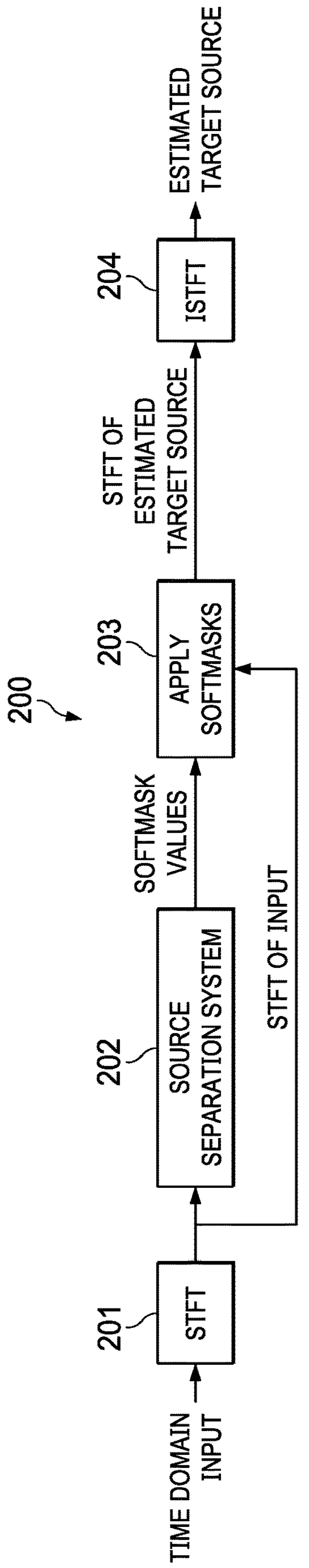
FIG. 2 is a block diagram of a system for source separation of audio sources, according to an embodiment.

FIG. 2 is a block diagram of a system 200 for source separation of audio sources, according to an embodiment. In this embodiment, it is assumed that the input is a two-channel mix. System 200 includes transform 201, source separation system 202 (which may also output subband panning parameter estimates), softmask applicator 203 and inverse transform 204. For this example embodiment, it is assumed that the target source to be extracted either has a known panning parameter, or that detection of such a parameter is performed using any number of techniques known to those skilled in the art. One example technique to detect a panning parameter is to peak pick from a level-weighted histogram on Θ values. Further note that, in some embodiments, the system expects there to be potentially different target source panning parameters for each roughly-octave subband.

Referring to FIG. 2, transform 201 is applied to a two-channel input signal (e.g., stereo mix signal). In an embodiment, the system 200 uses STFT parameters, including window type and hop size, which are known to be relatively optimal for source separation problems to those skilled in the art. However, other frequency parameters may be used. System 200 calculates a fraction of the STFT input to be output as a softmask. In some softmask source separation systems, system 200 estimates the SNR for each STFT tile, then the softmask calculation follows the assumption of a Wiener filter, and is: fraction of input=10^(SNR/20)/(10^(SNR/20)+1). Next, softmask applicator 203 multiples the input STFT for each channel by this fractional value between 0 and 1 for each STFT tile. Inverse transform 204 then inverts the STFT representation to obtain a two-channel time domain signal representing the estimated target source.

Although reference is made above to an STFT representation, any suitable frequency domain representation can be used. Although reference is made above to softmasks based on the assumption of a Wiener filter, softmasks based on other criteria can also be used.

Perceptual Optimization Techniques

Although the softmasks described above provide acceptable results in some or most circumstances, the softmasks can be improved for certain types of mixes, as described below.

Phase. As a general rule, for most relevant inputs, even ideal magnitude-only softmasks cannot produce perfect source estimates because they do not account for the fact that a target source to be separated will usually have different phase values than the input mixture. It can be shown that if a target source has energy in the same STFT tile as a background sound, it is highly unlikely that the mixture phase value will be the same as the target source's phase value. Using a magnitude-only softmask yields a target source estimate whose phase matches the input mixture phase, which is thus highly unlikely to be correct.

Panning. For source separation systems where a target source is panned between two channels, applying the softmasks may not necessarily lead to a source estimate where the STFT values have a magnitude ratio specified by their panning parameter. This is suboptimal because the model dictates that the ratio shall be as specified by (i as defined above. Specifically, the panned source model dictates that the ratio of the true signal in the right and left channels shall be $(\sin(\Theta_i)/\cos(\Theta_i))$, but the value produced by the softmask system could be anything. A solution for this situation is described below.

Non-Rigorous Artifact/Interference Trade-Offs. A given softmask specifies a (usually imperfect) source estimate which will contains artifacts, interferers (backgrounds) or both. To change the balance of artifacts and interferers, various informal approaches or "hacks" can be used, such as raising the softmask to some power (greater or less than 1). While these approaches may be useful, they are sometimes without rigorous justification. A way to choose modifications more optimally is described below.

Reduced source estimate level. Certain typical operations performed to create softmasks, as well as typical inputs used, can lead to situations where the source estimate achieved by applying the softmask is at a reduced level relative to the true level. A potential solution for this situation is described below.

Lack of frequency constraint. Depending on the system used to generate a softmask, the softmask itself may or may not be appropriately restricted to pass through only frequencies in the expected range of the target source. It is efficient to apply such information as post processing of a softmask.

Example Improvements

The embodiments described below address weaknesses of softmasks, so that a perceived quality of results improves. TABLE I below summarizes the types of improvements and notes the supporting information required. Each improvement is described in more detail below. It is acknowledged that the supporting information may not always be available. This information, however, is often relatively easy to estimate and allows substantial improvements.

TABLE I

Summary Of Perceptual Improvement Techniques

| Improvement Description | Magnitude/ Phase Modified | Supporting Info Required | Input channels required |
|---|---|---|---|
| Bulk reduction | Magnitude | Optional: Distribution of softmask values for STFT tiles dominated by target source and by interferers | Any |
| Expansion and limiting | Magnitude | Optional: Extraction "whiff factor" | Any |
| Overall EQ/ frequency shaping | Magnitude | Generic frequency profile of source | Any |
| Phase optimization | Phase | Panning parameter estimate. If non-panned source, phase difference concentration required. | 2 or more |
| Panning optimization | Magnitude | Panning parameter estimate | 2 or more |

Note that in theory all of these modifications could be applied only by modifying the softmasks themselves. In practice, however, it may be easier or more efficient to apply the modifications on the estimated target source STFT representation after the softmask is applied. In particular, the phase optimization and panning optimization techniques are understood to be more easily applied to an STFT representation of an estimated target source. These techniques, however, could also be applied to any other time-frequency representation which can be characterized by magnitude and phase. The use of the STFT representation is not intended to be limiting for purposes of this disclosure. Further, description of these techniques as applied to the STFT representation rather than the softmask is not intended to be limiting.

Figure 3:
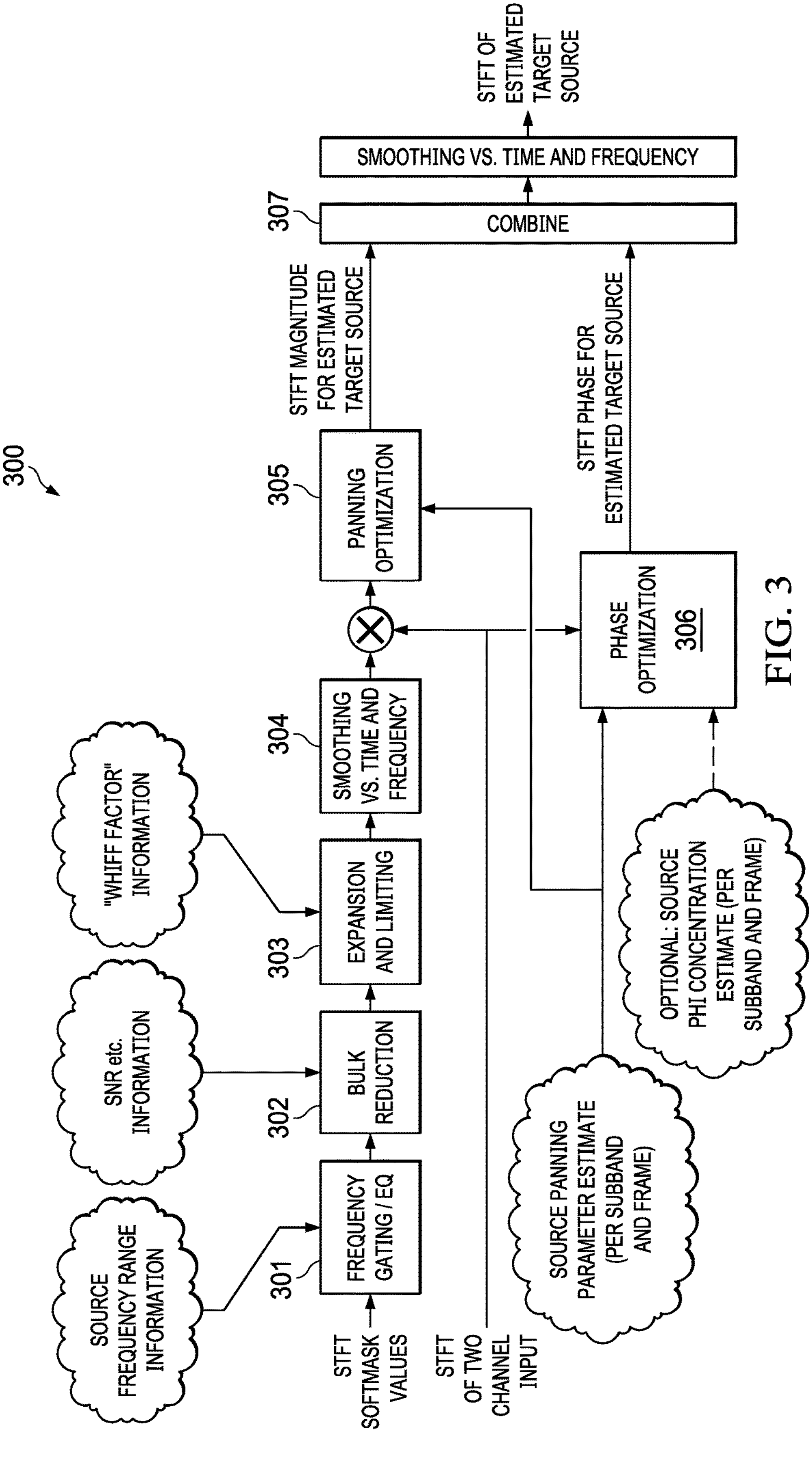
FIG. 3 is a block diagram of a system for perceptual optimization of magnitude and phase for time-frequency and softmask source separation, according to an embodiment.

FIG. 3 is a block diagram of system 300 for perceptual optimization of magnitude and phase for time-frequency and softmask source separation, according to an embodiment. FIG. 3 shall be understood to replace everything downstream of source separation system 202 in system 200. System 300 includes frequency gate/EQ 301, bulk reducer 302, expander/limiter 303, smoother 304, panning modifier 305, phase modifier 306, combiner 307 and smoother 308. System 300 shows a typical ordering of operations that would allow proper function, though other orderings could be chosen. As a point of contrast, the parts of FIG. 2 downstream of source separation 202, depict a baseline softmask system that does not apply the noted perceptual optimizations.

Frequency Gating/EQ

In an embodiment, the STFT softmask values output by the source separation system 202 in system 200 (See FIG. 2) are input into frequency gate/EQ 301. It is possible that some softmask systems will produce a source estimate which does not incorporate basic frequency range information about a source. For example, a system which produces estimates primarily on direction might produce a softmask for a target dialog source that includes frequencies below 80 Hz, even though energy typically does not exist in this frequency range for dialog sources. Or a softmask to extract a high-frequency-only percussive musical instrument might include nonzero values at frequencies below the range of the instrument. Frequency gate/EQ 301 solves this problem in the softmask domain by setting to near-zero (or even zero) any softmask values in frequency bins outside a specified frequency range. The near-zero values are necessary to create realistic filter shapes that will not lead to ringing artifacts in the time domain. Any typical filter design method known to those skilled in the art may be used to choose the shape of the filter applied at the softmask level.

Bulk Reduction

The output of frequency gate/EQ 301 is input into bulk reducer 302. Other information, such as SNR for the tile (e.g., the average SNR for each bin in the tile) and a bulk reduction threshold (described below) are also input into bulk reducer 302. Depending on a specific softmask system and the input to that system, there may be statistical realities which justify "bulk reduction" of some softmask parameters.

For example, consider a system in which the target source is generally somewhat louder than the backgrounds, and the softmask is "accurate enough" that it attenuates the backgrounds more than the target source. In this case, the softmask is doing well, but not performing perfectly. If the distribution on softmask values versus the relative level of target source or backgrounds is plotted, it can be observed that when the target source is dominant, the softmask values tend to be higher, but when the backgrounds are dominant the softmask values tend to be lower.

Given this reality, an intuitive solution emerges. Using any technique familiar to those skilled in the art, a "balance point" between those values of the softmask that correlate with "target dominant" STFT tiles and those that correlate with "background dominant" STFT tiles is estimated. For example, the SNR for a tile can be compared against a threshold SNR value, hereinafter referred to as the "bulk reduction threshold." The bulk reduction threshold is understood to exist on a softmask scale from 0 to 1 rather than on a decibel scale typically used to measure SNR. Note that the bulk reduction threshold is consistent enough for a given test data set that it may be set once and ignored from that point forward. This bulk reduction threshold depends generally on typical inputs as well as the system used to generate softmasks. For example, a balance point threshold value can be between 0.2 and 0.6.

Next, all softmask values below the bulk reduction threshold are reduced by multiplying them by some fractional value. Note that this is a better approach than just setting all of these values to zero, because doing so tends to introduce sometimes random modifications to the STFT magnitude versus frequency, which can trigger musical noise. An example fractional value is 0.33, though other fractional values, such as those in the range of 0.15 to 0.5, may also be used.

The goal of bulk reduction was, as suggested, to reduce interferers. In source separation, it is often the case that achieving this goal comes at the expense of introducing musical noise. Therefore, the bulk reduction threshold and fractional value should be chosen carefully to trade off in an optimal way for the application at hand. It is noted that the statistical exercise described above is not necessary to choose a threshold. The goal is improved perceptual results. Instead, listening tests can be performed to find a threshold suitable for a system and its expected inputs, given the tolerance of listeners to artifacts and interferers in a given application.

Expansion and Limiting

Next, the output of bulk reducer 302 is input into expander/limiter 303. The previous section described how to use bulk modification of softmasks to reduce backgrounds. A modification is now considered which can increase target source level. The need for this modification will depend on the softmask system used and the input provided. The overall reduction in level (versus the true level) is referred to herein as the "whiff factor." The following issues are considered.

Smoothing may reduce highest values. Some systems benefit from smoothing of the softmask versus frame and or frequency. However, softmasks, like the target sources they seek to extract, can be "peaky" meaning that they have high values surrounded by much lower ones. In such cases, smoothing over such values can lead to an overall reduction in the highest values, which, depending on the input, can be the softmask values most salient to perception. In this case, the reduced highest softmask values lead to lower perceived extracted source level.

Conservative softmasks may not specify the highest values "often enough." Some softmask systems tend to "back off" to moderate values when given ambiguous data. This can lead to smaller errors in such cases, and may reduce certain artifacts, but this may not necessarily be the desired perceptual result. This can be especially true in cases where the source separation system's output is remixed (for enhancement/boosting applications or remixing applications) in such a way that may reduce perceived artifacts. In such a case, some method to achieve higher levels of softmasks may be necessary.

Given these motivations, an approach is proposed to increase the level of the target source output, without creating clipping, by boosting the softmask level in one or both of two steps. In a first step, a fixed "expansion addition" value is added to all values of the softmask (e.g., add 0.3), and then all softmask values are multiplied by an "expansion multiplier" constant (e.g., 1.41), which adds approximately 3 dB to the magnitude of the softmask value. In a second step, any softmask values above 1.0 are reduced to 1.0.

Note that smoothing of the softmask values may be performed before, between or after the two steps shown above. FIG. 3 shows smoother 304 smoothing the softmask values output by expander/limiter 304, but the smoothing step is optional and thus not intended to be restrictive.

It is noted that the two techniques just described (bulk reduction, expansion and limiting) can be combined in ways that lead to rather strong modifications of the softmask, leaving few values around 0.5 and many values near 0 or 1. Thus, these techniques can be thought of as methods to vary between a softmask system and a binary mask system. Consider the following examples of parameter choices.

Choose a bulk reduction threshold of 0.6 and a bulk reduction fraction of 0.1. This means any value below 0.6 will now be 0.06 or less. Also, choose a softmask expansion multiplier of 1.4. This means that the previously reduced values will be at a maximum of 0.08. The other values (0.6 or higher) will now be scaled up to 0.84 to 1.4, then reduced to a maximum of 1.0. Therefore, there would be no values between 0.08 and 0.84, and the system performs much like a binary mask system would.

Choosing exceptional values like a bulk reduction threshold of 0.6, a reducing fraction of 0 and an expansion ratio of 1.7 will ensure that 100% of values become 0 or 1, converting the softmask into a binary mask. Binary masks have their own advantages and disadvantages. Great care should be exercised in choosing reduction and expansion parameters.

Phase and Panning Optimization

Above, it was mentioned that the stereo (two channel) case sometimes would be relevant and that panned sources could be relevant. Such a case will now be considered, including how to benefit from assumptions of this case even for target sources that are not panned.

First, consider estimation of a panned target source. If the estimated source fits the panned source model, then for each STFT tile, the following are true.

The left and right channel magnitudes shall have a specific ratio. Also recall that if only the target source is present in the mix (no backgrounds) then every tile in the STFT shall have this ratio between the channels' STFTs, namely (sin $(\Theta_i)/\cos(\Theta_i)$).

The left and right channels shall have identical phase, meaning the difference between them is zero. Recall that if only the target source is present in the mix (no backgrounds) then every tile in the STFTs has this phase difference of zero. How to relax this assumption in some cases, while still improving perceived result quality, is described below. Therefore, it is immediately clear that most softmask source estimates are not optimal for panned target sources because they produce STFT magnitude estimates whose ratio is whatever it was in the mix. But as noted above it should be $(\sin(\Theta_1)/\cos(\Theta_1))$ for the panned source i. Therefore, a goal is to modify the estimate to have this ratio.

The STFT tiles produce STFT phase estimates whose difference between left and right channels is whatever it was in the original mix. But as noted it should be zero. Therefore our goal is to convert this difference to zero. It can be shown that in some cases, the difference should be nonzero, but a consistent value within a subband. The goal can then be to convert the large range of differences in the phase estimate to a single, consistent phase estimate for the subband, rather than making the difference zero. How to achieve each of these goals is described below.

The Role of Subbands

Before moving on to describe details of panning and phase optimization, subbands are considered. As suggested above, there are cases where the panning parameter (which dictates the STFT magnitude ratio) is not consistent across subbands, where there is a consistent but nonzero p value within a subband, or both. It is therefore proposed that the optimizations here be performed in subbands. That is, instead of the goal having the magnitude ratio between STFT representations consistent across all frequencies, the goal is consistency within a subband, to match a particular subband panning value. Similarly, the goal for phase is to ensure a consistent p value (interchannel phase difference) value within a subband, not a 9 value of zero across all frequencies. The general concept of forcing consistent zero P was proposed in Aaron S. Master. Stereo Music Source Separation via Bayesian Modeling. Ph.D. Dissertation, Stanford University, June 2006. The method proposed below modifies the general concept.

Subband Phase Optimization

The goal of requiring the STFT output to have a specific phase relationship between the channels for each subband was described above. For a source which is strictly panned, the relationship is that the phases shall be identical (difference of zero). For a source with reverb or delay the relationship is that the difference shall be a different but constant value in the subband.

For each case (difference of zero or consistent nonzero difference), there are an infinite number of such solutions. That is, for the zero difference case, the left and right phase values could be for example 0.2 and 0.2, or −2.4 and −2.4, or any other matching pair. The information to work with is: (1) the mixture left channel phase value; (2) the mixture right channel phase value; (3) knowledge that the phase values should have a specific relationship; and (4) some estimate of the panning parameter.

For the zero difference case, one option is to copy the left channel phase value to the right channel, or vice versa. Another option is to take their average. Note that this is potentially problematic because phase is circular with positive and negative π representing the same value; averaging values near +/−π leads to zero which is not near either positive π or negative π. Therefore, if choosing the averaging approach, the real and imaginary parts of the STFT values are averaged before calculating the phase. However, there is also a problem with taking the average of the channel phases if the target source is panned all the way to the right channel. In this case, the left channel phase information is not useful as it contains none of the target source signal, while the right channel information is more useful.

As mentioned above, in many cases a panning parameter estimate for the subband in question is available and can be exploited. It is, however, generally a relatively simple task to estimate such a parameter if and when it exists. Therefore, the following steps are proposed.

In a first step, calculate a weight for the left channel and right channel based on the estimated panning parameter for the target source in this subband, as shown in Equations [12] and [13]. This way, the right panned sources will use the right channel phase, the left panned sources will use the left channel phase and the center panned sources will use both the right channel phase and the left channel phase equally:

$$\text{rightWeight}=(\text{panning parameter estimate})/(\pi/2), \quad [12]$$

$$\text{leftWeight}=1-\text{rightWeight}. \quad [13]$$

In a second step, compute a weighted average of the left and right input mix STFT values output from STFT 201 (See FIG. 2), using rightWeight and leftWeight as just specified.

In a third step, compute the phase of the weighted average as $\varphi_L$*(1-rightWeight)+$\varphi_R$*rightWeight, where $\varphi_L$ and $\varphi_R$ are the phases of the left and right channels, respectively. If the goal is to approximate a panned source, use the phase of the weighted average for both the right and left channels. If the goal is to approximate a source with a specific nonzero phase difference between the channels, half the difference is added to the right channel phase, and half the difference is subtracted from the left channel phase. If, after this process, either value is outside −π to in radians the value is wrapped to exist in the range [−π, π).

Subband Panning Optimization

As described above, within a subband, processing can be used to enforce a relationship between the phase of the two STFT channels. How to enforce a relationship between the magnitudes of the two STFT channels will now be described. As with phase optimization, panning optimization relies on an estimate of the panning parameter $\Theta_i$ in a subband. In this case, such an estimate gives a specific ratio according to the definition of Θ, namely:

$$\text{ratioL}=\cos(\text{panning parameter estimate for } \Theta_i), \quad [14]$$

$$\text{ratioR}=\sin(\text{panning parameter estimate } \Theta_i). \quad [15]$$

From these ratios, the STFT output for the target source is specified as follows:

$$\text{Left Magnitude}=\text{ratio}L*\text{softmaskValue}*U(\omega,t), \quad [16]$$

$$\text{Right Magnitude}=\text{ratio}R*\text{softmaskValue}*U(\omega,t). \quad [17]$$

There are several perceptual benefits of phase and panning optimization. It has been shown that listeners describe the sound as "more focused" or "clearer." This makes intuitive sense as it has been documented that accurate phase information enhances the clarity of sound (Master 2006), and the disclosed phase optimization exploits information about mixing to estimate more accurate phase. Under panning optimization, listeners also describe the target source as louder than the interferers. This also makes sense. The extraction of a target source may not be perfect. If the erroneously extracted backgrounds are obtained at the exact same location as the accurately extracted (and hopefully, louder) target source, it will be harder to perceive the backgrounds because the target source will spatially mask them.

Non-Specified Improvements Via Smoothing

Referring again to FIG. 3, smoother 304 smooths the softmask itself (versus frame and frequency), and smoother 308 smooths the STFT domain signal estimate (also versus frame and frequency). These smoothing operations may be performed using any number of techniques familiar to those skilled in the art. Note that due to the "peaky" nature of target sources (like speech) in the STFT domain, excessive smoothing can lead to reduced magnitude of the mask or target source estimate. In this case, the expansion and limiting technique implemented by expansion/limiter 303 described above could be used instead of smoother 304 and smoother 308.

Example Processes

Figure 4:
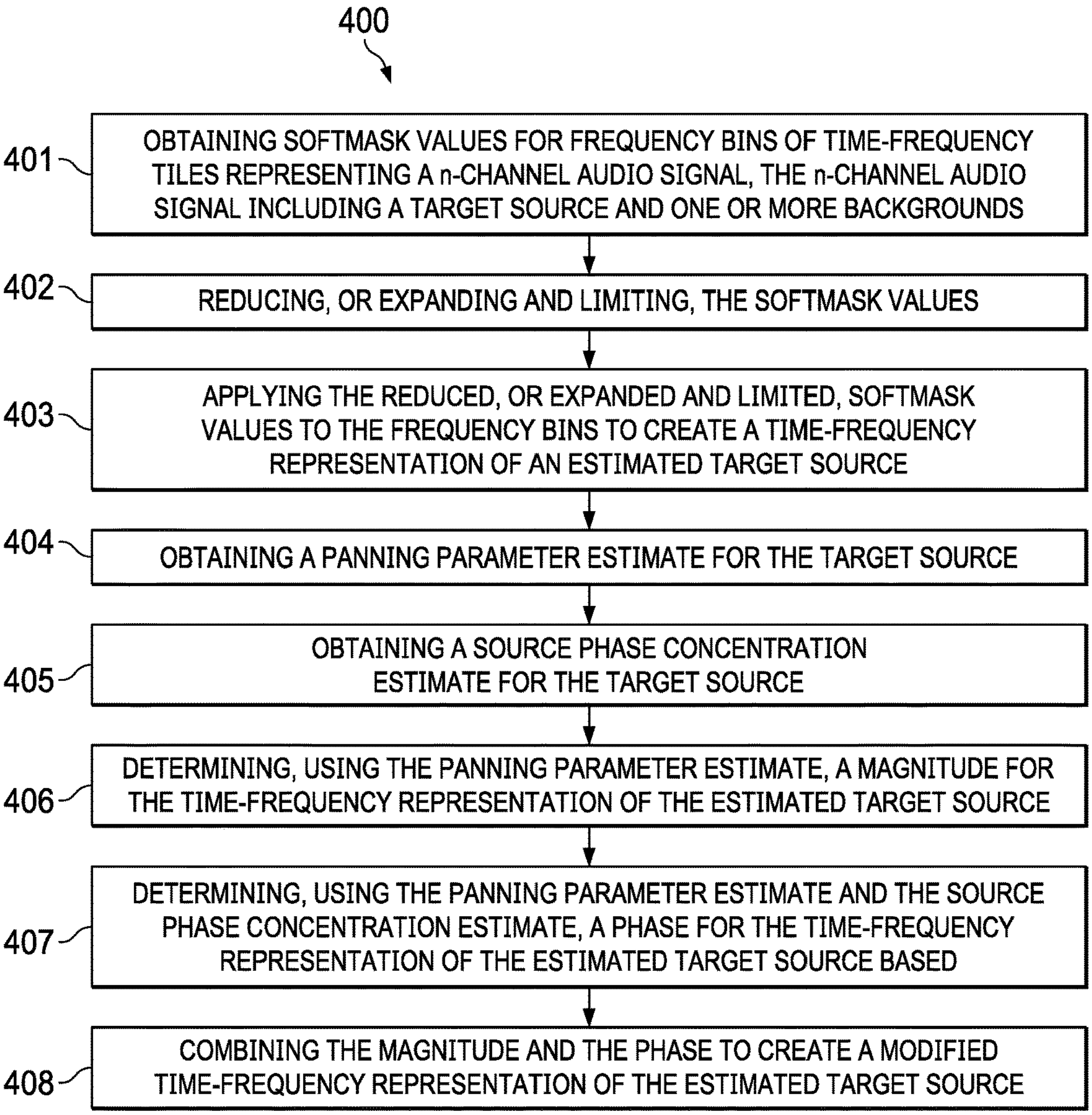
FIG. 4 is a flow diagram of a process of perceptual optimization of magnitude and phase for time-frequency and softmask source separation, in accordance with an embodiment.

FIG. 4 is a flow diagram of process 400 of perceptual optimization of magnitude for time-frequency and softmask source separation, in accordance with an embodiment. Process 400 can be implemented using the device architecture 500, as described in reference to FIG. 5.

Process 400 can begin by obtaining softmask values for frequency bins of time-frequency tiles representing a two-channel audio signal, the two-channel audio signal including a target source and one or more backgrounds (401), reducing, or expanding and limiting, the softmask values (402), and applying the reduced, or expanded and limited, softmask values to the frequency bins to create a time-frequency representation of an estimated target source (403). Each of these steps is described in reference to FIG. 3.

Process 400 continues by obtaining a panning parameter estimate for the target source (404), obtaining a source phase concentration estimate for the target source (405), determining, using the panning parameter estimate, a magnitude for the time-frequency representation of the estimated target source (406), determining, using the panning parameter estimate and the source phase concentration estimate, a phase for the time-frequency representation of the estimated target source based (607), and combining the magnitude and the phase to create a modified time-frequency representation of the estimated target source. Each of these steps is described in reference to FIG. 3.

Example Device Architecture

Figure 5:
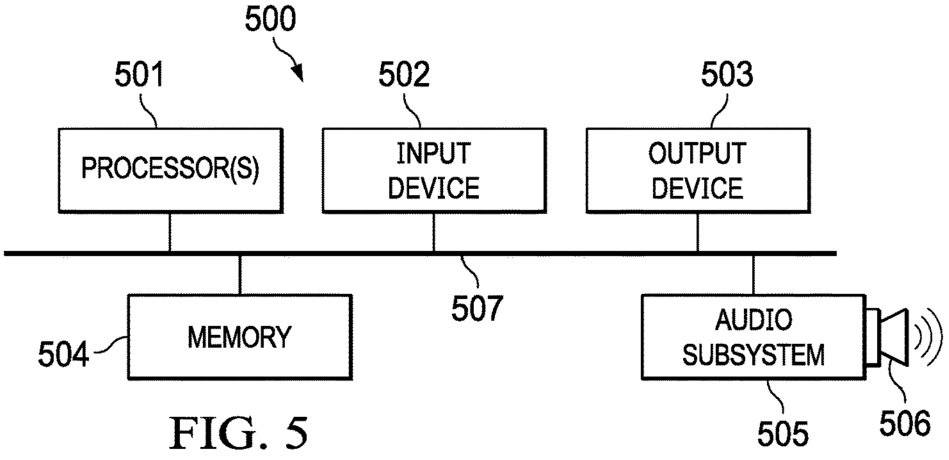
FIG. 5 is a block diagram of a device architecture for implementing the systems and processes described in reference to FIGS. 1-4, according to an embodiment.

FIG. 5 is a block diagram of a device architecture 500 for implementing the systems and processes described in reference to FIGS. 1-4, according to an embodiment Device architecture 500 can be used in any computer or electronic device that is capable of performing the mathematical calculations described above.

In the example shown, device architecture 500 includes one or more processors 501 (e.g., CPUs, DSP chips, ASICs), one or more input devices 502 (e.g., keyboard, mouse, touch surface), one or more output devices (e.g., an LED/LCD display), memory 504 (e.g., RAM, ROM, Flash) and audio subsystem 506 (e.g., media player, audio amplifier and supporting circuitry) coupled to loudspeaker 506. Each of these components are coupled to one or more busses 507 (e.g., system, power, peripheral, etc.). In an embodiment, the features and processes described herein can be implemented as software instructions stored in memory 504, or any other computer-readable medium, and executed by one or more processors 501. Other architectures are also possible with more or fewer components, such as architectures that use a mix of software and hardware to implement the features and processes described here.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Various aspects of the present invention may be appreciated from the following enumerated example embodiments (EEEs):

EEE1. A method comprising:

- obtaining softmask values for frequency bins of time-frequency tiles representing an audio signal, the audio signal including a target source and one or more backgrounds;
- reducing, or expanding and limiting, the softmask values; and
- applying the reduced, or expanded and limited, softmask values to the frequency bins to create a time-frequency representation of an estimated target source.

EEE2. The method of claim EEE1, further comprising:

- setting to zero or near-zero the softmask values in the frequency bins that are outside a specified frequency range.

EEE3. The method of any one of EEEs 1-2, wherein the time-frequency tiles represent a two-channel audio signal and the frequency bins of the time-frequency tile are organized into subbands, the method further comprising:

- obtaining a panning parameter estimate for the target source;
- obtaining a source phase concentration estimate for the target source;
- determining, using the panning parameter estimate, a magnitude for the time-frequency representation of the estimated target source;

determining, using the panning parameter estimate and the source phase concentration estimate, a phase for the time-frequency representation of the estimated target source based; and combining the magnitude and the phase to create a modified time-frequency representation of the estimated target source.

EEE4. The method of claim EEE3, wherein determining, using the panning parameter estimate and the source phase concentration estimate, a phase for the time-frequency representation of the estimated target source based, further comprises:

computing, using the panning parameter estimate, a first weight for a left channel phase and a second weight for a right channel phase;

computing a weighted average of the left and right channel phases using the first weight and the second weight, respectively; and adjusting the phase parameter of the time-frequency tile for the time-frequency representation of the estimated target source to be the weighted average of the left and right channel phases.

EEE5. The method of EEE3 or EEE4, wherein determining, using the panning parameter estimate, a magnitude for the time-frequency representation of the estimated target source, further comprises:

computing a left channel ratio as a function of the panning parameter estimate;

computing a right channel ratio as a function the panning parameter estimate;

computing a left channel magnitude for the left channel based on the product of the left channel ratio, a softmask value and a level of the frequency bin; and computing a right channel magnitude based on the product of the right channel ratio, the softmask value for the frequency bin and the level of the frequency bin.

EEE6. The method of any one of EEEs 1-5, wherein reducing the softmask values, further comprises:

estimating a bulk reduction threshold, the bulk reduction threshold representing a balance point between softmask values that correlate with target dominant time-frequency tiles and softmask values that correlate with background dominant time-frequency tiles; and multiplying each softmask value that f alls below the bulk reduction threshold by a fractional value.

EEE7. The method of any one of EEEs 1-6, wherein expanding and limiting the softmask values, further comprises:

adding a fixed expansion addition value to the softmask values;

multiplying the softmask values by an expansion multiplier constant; and limiting any softmask values that are above 1.0 to 1.0.

EEE8. A method comprising:

transforming, using one or more processors, one or more frames of a time domain audio signal into a time-frequency domain representation including a plurality of time-frequency tiles, wherein the time domain audio signal includes a target source and one or more background, and wherein the frequency domain of the time-frequency domain representation includes a plurality of frequency bins grouped into a plurality of subbands;

for each time-frequency tile:

calculating, using the one or more processors, spatial parameters and a level for the time-frequency tile;

obtaining, using the one or more processors, a softmask value for each frequency bin using the spatial parameters, the level and subband information; and reducing, or expanding and limiting, the softmask values; and applying, using the one or more processors, the softmask values to the time-frequency tile to generate a time-frequency tile of an estimated audio source.

EEE9. The method of EEE8, further comprising:

setting to zero or near-zero the softmask values in the frequency bins that are outside a specified frequency range.

EEE10. The method of any one of EEEs 8-9, wherein the time-domain audio signal is a two-channel audio signal and the frequency bins of the time-frequency tile are organized into subbands, the method further comprising:

obtaining a panning parameter estimate for the target source;

obtaining a source phase concentration estimate for the target source;

determining, using the panning parameter estimate, a magnitude for the time-frequency representation of the estimated target source;

determining, using the panning parameter estimate and the source phase concentration estimate, a phase for the time-frequency representation of the estimated target source based;

and combining the magnitude and the phase to create a modified time-frequency representation of the estimated target source.

EEE11. The method of EEE10, wherein determining, using the panning parameter estimate and the source phase concentration estimate, a phase for the time-frequency representation of the estimated target source based, further comprises:

computing, using the panning parameter estimate, a first weight for a left channel phase and a second weight for a right channel phase;

computing a weighted average of the left and right channel phases using the first weight and the second weight, respectively; and adjusting the phase parameter of the time-frequency tile for the time-frequency representation of the estimated target source to be the weighted average of the left and right channel phases.

EEE12. The method of EEE10 or c EEE11, wherein determining, using the panning parameter estimate, a magnitude for the time-frequency representation of the estimated target source, further comprises:

computing a left channel ratio as a function of the panning parameter estimate;

computing a right channel ratio as a function the panning parameter estimate;

computing a left channel magnitude for the left channel based on the product of the left channel ratio, a softmask value and a level of the frequency bin; and computing a right channel magnitude based on the product of the right channel ratio, the softmask value for the frequency bin and the level of the frequency bin.

EEE13. The method of any one of EEEs 8-12, wherein reducing the softmask values, further comprises:

estimating a bulk reduction threshold, the bulk reduction threshold representing a balance point between softmask values that correlate with target dominant time-frequency tiles and softmask values that correlate with background dominant time-frequency tiles; and multiplying each softmask value that falls below the bulk reduction threshold by a fractional value.

EEE14. The method of any one of EEEs 8-13, wherein expanding and limiting the softmask values, further comprises:

adding a fixed expansion addition value to the softmask values;

multiplying the softmask values by an expansion multiplier constant; and limiting any softmask values that are above 1.0 to 1.0.

EEE15. An apparatus comprising:

one or more processors;

memory storing instructions that when executed by the one or more processors, cause the one or more processors to perform any of the preceding methods EEEs 1-14.

The invention claimed is:

1. A method comprising:

obtaining softmask values for frequency bins of time-frequency tiles representing an audio signal, the audio signal including a target source and one or more backgrounds;

reducing the softmask values; and applying the reduced softmask values to the frequency bins to create a time-frequency representation of an estimated target source, wherein reducing the softmask values comprises:

estimating a bulk reduction threshold, the bulk reduction threshold representing a balance point between softmask values that correlate with target dominant time-frequency tiles and softmask values that correlate with background dominant time-frequency tiles; and multiplying each softmask value that falls below the bulk reduction threshold by a fractional value.

2. The method of claim 1, further comprising, prior to obtaining the softmask values, transforming, using one or more processors, one or more frames of a time domain audio signal into a time-frequency domain representation including the time-frequency tiles, wherein the time-frequency domain representation includes the target source and the one or more backgrounds, and wherein the frequency domain of the time-frequency domain representation includes the frequency bins grouped into a plurality of subbands.

3. The method of claim 2, wherein the time domain audio signal is a multiple-channel audio signal, further comprising:

for each time-frequency tile:

calculating spatial parameters and a level for the time-frequency tile, and obtaining the softmask values using the spatial parameters, the level and a subband information.

4. The method of claim 1, further comprising:

setting to zero or near-zero the softmask values in the frequency bins that are outside a specified frequency range.

5. A method comprising:

obtaining softmask values for frequency bins of time-frequency tiles representing an audio signal, the audio signal including a target source and one or more backgrounds;

expanding and limiting the softmask values; and applying the expanded and limited, softmask values to the frequency bins to create a time-frequency representation of an estimated target source, wherein expanding and limiting the softmask values, further comprises:

adding a fixed expansion addition value to the softmask values;

multiplying the softmask values by an expansion multiplier constant; and limiting any softmask values that are above 1.0 to 1.0.

6. The method of claim 5, further comprising, prior to obtaining the softmask values, transforming, using one or more processors, one or more frames of a time domain audio signal into a time-frequency domain representation including the time-frequency tiles, wherein the time-frequency domain representation includes the target source and the one or more backgrounds, and wherein the frequency domain of the time-frequency domain representation includes the frequency bins grouped into a plurality of subbands.

7. The method of claim 6, wherein the time domain audio signal is a multiple-channel audio signal, further comprising:

for each time-frequency tile:

calculating spatial parameters and a level for the time-frequency tile, and obtaining the softmask values using the spatial parameters, the level and a subband information.

8. The method of claim 5, further comprising:

setting to zero or near-zero the softmask values in the frequency bins that are outside a specified frequency range.

9. A method comprising:

obtaining softmask values for frequency bins of time-frequency tiles representing an audio signal, the audio signal including a target source and one or more backgrounds, wherein the time-frequency tiles represent a multiple channels audio signal and the frequency bins of the time-frequency tiles are organized into a plurality of subbands, the method further comprising, for each time-frequency tile:

obtaining softmask values for frequency bins of time-frequency tiles representing the multiple channels audio signal;

applying the softmask values to the frequency bins to create a time-frequency domain representation of an estimated target source; wherein the method further comprises:

obtaining a panning parameter estimate for the target source;

obtaining a source phase concentration estimate for the target source, wherein the source phase concentration estimate is obtained by estimating a statistical distribution of phase differences between the multiple channels in the time-frequency tiles for capturing a predetermined amount of audio energy of the target source;

determining, using the panning parameter estimate and the softmask values, a magnitude for the time-frequency domain representation of the estimated target source;

determining, using the panning parameter estimate and the source phase concentration estimate, a phase for the time-frequency domain representation of the estimated target source based; and combining the magnitude and the phase to create a modified time-frequency domain representation of the estimated target source.

10. The method of claim 9, further comprising, prior to obtaining the softmask values, transforming, using one or more processors, one or more frames of a time domain audio signal into a time-frequency domain representation including the time-frequency tiles, wherein the time-frequency domain representation includes the target source and the one or more backgrounds, and wherein the frequency domain of the time-frequency domain representation includes the frequency bins grouped into the plurality of subbands.

11. The method of claim 10, further comprising:

for each time-frequency tile:

calculating spatial parameters and a level for the time-frequency tile, and obtaining the softmask values using the spatial parameters, the level and a subband information.

12. The method of claim 9, wherein determining, using the panning parameter estimate and the source phase concentration estimate, a phase for the time-frequency domain representation of the estimated target source based, further comprises:

computing, using the panning parameter estimate, a first weight for a left channel phase and a second weight for a right channel phase;

computing a weighted average of the left and right channel phases using the first weight and the second weight, respectively; and adjusting a phase parameter of the time-frequency tile for the time-frequency domain representation of the estimated target source to be the weighted average of the left and right channel phases.

13. The method of claim 9, wherein determining, using the panning parameter estimate and the softmask values, a magnitude for the time-frequency domain representation of the estimated target source, further comprises:

computing a left channel ratio as a function of the panning parameter estimate;

computing a right channel ratio as a function the panning parameter estimate;

computing a left channel magnitude for the left channel based on a product of the left channel ratio, a softmask value and a level of the frequency bin; and computing a right channel magnitude based on the product of the right channel ratio, the softmask value for the frequency bin and the level of the frequency bin.

14. The method of claim 9, wherein estimating the statistical distribution of the phase differences between the multiple channels in the time-frequency tiles further comprises:

determining a peak value of the statistical distribution;

determining a phase difference corresponding to the peak value; and determining a width of the statistical distribution around the peak value for capturing the amount of audio energy.

15. The method of claim 9, wherein the predetermined amount of audio energy is at least eighty percent of a total energy in the statistical distribution of the phase differences.

* * * * *